June 6, 1972  R. A. CRAMER, JR  3,667,873
WATER MOVING APPARATUS FOR DESTRATIFICATION, ICE
REDUCTION AND BARNACLE CONTROL
Filed Nov. 2, 1970

INVENTOR.
Roy A. Cramer Jr.
BY
Fishburn, Gold & Litman
ATTORNEYS

United States Patent Office 3,667,873
Patented June 6, 1972

3,667,873
WATER MOVING APPARATUS FOR DESTRATI-
FICATION, ICE REDUCTION AND BARNACLE
CONTROL
Roy A. Cramer, Jr., c/o Anchormatic, 1020 E. 79th
Terrace, Kansas City, Mo. 64131
Filed Nov. 2, 1970, Ser. No. 85,898
Int. Cl. B01f 5/12; E02b 3/00; F04b 17/00
U.S. Cl. 417—424
9 Claims

ABSTRACT OF THE DISCLOSURE

A water moving apparatus for destratification, ice reduction and barnacle control in a body of water includes an elongated column member suitably mounted on a support and extending downwardly into a body of water and having a diffusing member, a submersible motor and an upwardly directed propeller associated with the motor, all being mounted adjacent a lower end of the column member whereby operation of the propeller and the diffusing member effect an upwardly and outwardly diffused flow in the body of water thereby moving warmer subsurface water to the surface and effecting a circulation that provides aeration thereof and decreasing stratification and more uniform temperature of the body of water and the water is moved with a velocity of flow sufficient to substantially eliminate adherence of barnacles to surfaces within the body of water.

The present invention relates to water moving apparatus and more particularly to a water moving apparatus operative to move warmer subsurface water to the surface thereby effecting aeration and decreasing the natural stratification of the body of water and effecting a more uniform temperature therein and to move water with sufficient velocity to substantially eliminate adherence of barnacles to surfaces within the body of water.

The principal objects of the present invention are: to provide a water moving apparatus operative to thaw surface ice and prevent same from reforming over a wide range of temperatures, such as from freezing down to minus twenty degrees Fahrenheit (−20° F.); to provide such a water moving apparatus adapted to effect an upwardly and outwardly flow of warm subsurface water to the surface thereby warming and aerating the surface and breaking the surface tension of the surface water; to provide such a water moving apparatus adapted to effect a velocity of flow sufficient to substantially eliminate adherence of barnacles to boat hulls, surfaces within the body of water, and the like; to provide such a water moving apparatus particularly adapted for use in pollution areas which is operative to effect aeration of water thereby promoting growth of organisms which digest organic material within the body of water; to provide such a water moving apparatus operative to eliminate floating debris, wind-blown ice, and the like, from a selected cleared area within a marina or the like; to provide such a water moving apparatus adapted to prevent ice damage to boats, docks, and like structures and to substantially eliminate the need to dry store many types of boats; and to provide such a water moving apparatus which is economical to manufacture, durable in operation, substantially maintenance free, positive in operation, and particularly well adapted for the proposed uses.

Other objects and advantages of this invention will become apparent from the following description taken in connection with the accompanying drawings wherein are set forth by way of illustration and example certain embodiments of this invention.

Figure 1:
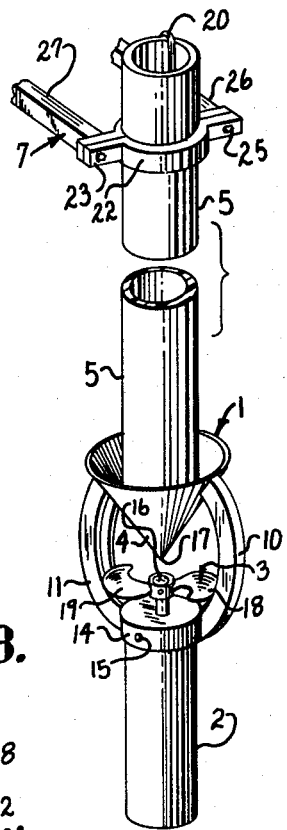
FIG. 1 is a perspective view of a water moving apparatus embodying features of the present invention.
Figure 2:
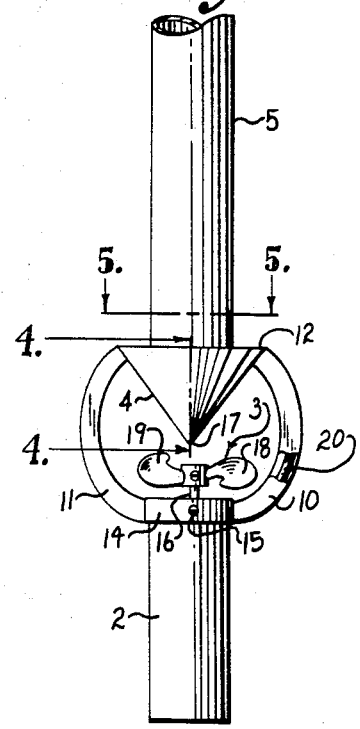
FIG. 2 is an elevational view of the water moving apparatus.
Figure 3:
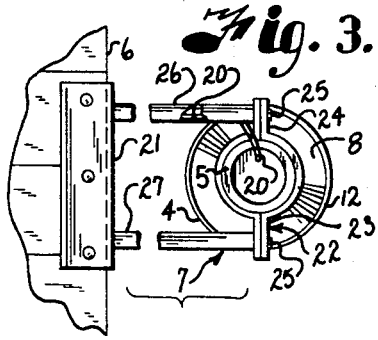
FIG. 3 is a plan view of a bracket for mounting the water moving apparatus on a structure in a body of water.
Figure 4:
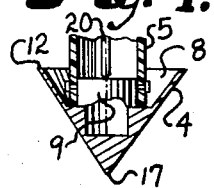
FIG. 4 is a fragmentary sectional view taken on line 4—4, FIG. 2 showing the mounting of a flow diffusing member on a column member.
Figure 5:
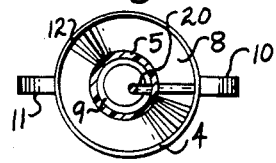
FIG. 5 is a transverse sectional view taken on line 5—5, FIG. 2 showing the flow diffusing member in plan view.

Referring more in detail to the drawings:

The reference numeral 1 generally designates a water moving apparatus for destratification, ice reduction and barnacle control in a body of water. The water moving apparatus 1 is operative to move warm sub-thermocline water upwardly and outwardly to the surface of a body of water to aerate the water and decrease natural stratification of the body of water and maintain a more uniform temperature throughout the body of water and effect a flow having sufficient velocity to substantially eliminate adherence of barnacles to surfaces within the body of water. The water moving apparatus 1 includes a motor 2 operative to rotate a propeller 3 to move warmer subsurface water upwardly toward a flow diffusing member in the form of a cone-shaped member 4 which diffuses the flow upwardly and outwardly thereby distributing the moving water over a wide area.

In the illustrated structure, a column member 5 is mounted on a suitable support structure in a body of water, such as a dock 6 or on/or alongside a boat or the like, by a bracket 7, as later described. The column member 5 is illustrated as an elongated tubular member extending downwardly into the body of water and having the cone-shaped flow diffusing member 4 mounted on a lower end of the column member 5. The illustrated cone-shaped member 4 has an upwardly open cavity 8 with a boss 9 centered therein to receive the lower end of the tubular column member 5 thereon and the cone-shaped diffusing member 4 and the lower end of the column member 5 are suitably secured together, as by a plurality of circumferentially spaced bolts or screws extending through a wall of the column member and into the boss 9.

The motor 2 and the propeller 3 are positioned in axially aligned spaced relation with the cone-shaped member 4 to provide a substantially uniform distribution of the flow and the sides of the cone-shaped diffusing member 4 are illustrated as forming an acute angle with the axis thereof in the nature of forty-five degrees (45°) to thereby form an included angle between the sides in the nature of ninety degrees (90°).

The cone-shaped diffusing member 4 is effective in diffusing the flow effected by the propoller 3 upward and outward into a generally circular area equivalent to a diameter of eight feet (8') for every foot of propeller depth, for example, a water moving apparatus 1 having the propeller 3 thereof positioned at a depth of five feet (5') is effective to thaw surface ice within a circular area having a diameter of forty feet (40') and maintain same free of ice, floating debris, and wind-blown ice and the like.

The propeller 3 is positioned adjacent the diffusing member 4, such as being spaced a few inches below same whereby flow effected by the propeller 3 is diffused upwardly and outwardly by the sides of the diffusing member 4 and the support or mounting of the motor and propeller is illustrated as including a pair of opposed arms 10 and 11 each having one end thereof suitably secured to the cone-shaped diffusing member 4 adjacent a rim 12 thereof, as by welding, and the other end of the arms 10 and 11 are each secured to a motor support member 14 in the form of a loop or ring sized and shaped to receive and support a housing of the motor 2 therein, as by a plurality of spaced bolts or screws 15 extending through the motor support member 14 and into the housing of the motor 2, to thereby securely position the motor and propeller relative to the diffusing member 4.

The motor 2 is operative to rotate a shaft 16 which extends upwardly from the motor 2 and is coaxial with the cone-shaped diffusing member 4 and aligned with a point 17 thereof and the shaft 16 has the propeller 3 mounted thereon and rotatable therewith. The motor 2 is a submersible, high speed, electric motor operative to rotate the shaft 16 and the propeller 3 mounted thereon at a speed in the nature of 3000 to 3500 r.p.m.

The propeller 3 is illustrated as having a pair of opposed arcuate or curved blades 18 and 19 each having a pitch and configuration to effect an upwardly directed flow in the body of water toward the point 17 and sides of the cone-shaped diffusing member 4 with the flow being in the nature of 2.5 to 3.0 miles per hour which is sufficient to substantially eliminate adherence of barnacles to boat hulls, surfaces within the body of water, and the like.

A waterproof electrical conduit 20 having a suitable electrical conductor therein electrically connects the motor 2 to a source of electrical power (not shown) to complete a circuit which when energized will start and run the motor 2 and thereby rotate the shaft 16 and the propeller 3 thereon. In the illustrated structure, the conduit 20 has a portion thereof positioned within the tubular column member 5 and extending longitudinally therealong to a point adjacent a lower end of the column member 5 and another portion of the electrical conduit 20 is in engagement with and supported by one of the arms, for example arm 10, for electrical connection with the motor 2.

The bracket 7 may be of any suitable construction adapted to be mounted on a support structure and permit vertical adjustment of the propeller 3 below the surface of the body of water and secure same in a selected position. The bracket 7 is illustrated as including a mounting member 21 suitably secured to a support structure, such as a boat or the dock 6, and a clamping member 22 removably secured to the mounting member 21 and engageable with the column member 5 for holding same in clamping engagement between the mounting member 21 and the clamping member 22. In the illustrated structure, the clamping member 22 has end portions 23 and 24 adapted to receive suitable fastening devices, such as bolts 25, for holding the column member in a selected position.

It may be desirable to space the water moving apparatus 1 outwardly from the dock, boat or other support structure, having the water moving apparatus supported thereon so as to provide a larger ice free and debris free area adjacent the boat or structure, therefore, the bracket 7 may have a pair of spaced arms 26 and 27 extending outwardly from the mounting member 21 and an edge member 28 extending between the free ends of the arms 26 and 27 to receive the clamping member 22 and the bolts 25.

The water moving apparatus 1 is operative to thaw surface ice, prevent ice from forming, aerate the surface, control barnacles, and reduce water pollution in bodies of salt water and salt free inland bodies of water, therefore, all the material and operating parts of the water moving apparatus 1 are salt water-proofed including the motor 2 and the conduit 20 connected thereto.

The column member 5 is preferably sufficiently flexible to resist impact or damage during shipment and installation and to resist crushing by ice forming when the apparatus is turned off, therefore, the column member 5 is formed of a suitable plastic which may be formed conveniently by extrusion, such as synthetic resinous materials of the thermoplastics including polypropylene, polystyrene, polyvinylchloride, and acrylonitrile-butadiene-styrene (commonly referred to as ABS) and thermoset plastics including phenol-formaldehyde, polyester, and epoxy resins. The synthetic resinous materials may be suitably reinforced with either organic or inorganic fibers, such as cellulose fibers, asbestos fibers, and fibrous glass to increase the strength of column member 5.

The cone-shaped diffusing member 4, arms 10 and 11, motor support member 14, shaft 16, propeller 3, and motor housing are preferably formed of a metal which is resistant to formation of rust and corrosion, such as stainless steel and suitable steel alloys including chromium, nickel, and the like, and brass and bronze.

In operation of a water moving apparatus constructed as described and illustrated, the mounting member 21 is secured in a desired location on a support structure, such as a boat, the dock 6, or the like, and the water moving apparatus 1 is extended downwardly into the body of water to position the propeller 3 at the desired depth below the surface and the column member 5 is held in a substantially vertical position by the clamping member 22. After the propeller 3 is positioned at the desired distance below the surface of the body of water and secured in position by the bracket 7, the motor 2 is started by activating or energizing an electrical circuit by an electrical current conveyed through the electrical conductor in the conduit 20 to the motor 2 which is operative to rotate the shaft 16 and the propeller 3 thereon to effect an upward flow towards the point 17 and sides of the cone-shaped diffusing member 4 which diffuses the flow upwardly and outwardly to move warmer subsurface water to the surface whereby natural stratification of the body of water is decreased and the temperature of the body of water is made more uniform by raising the temperature of the surface above freezing thereby thawing surface ice and preventing same from reforming and the water is aerated thereby promoting growth of organisms which digest organic matter commonly found in polluted waters. The propeller 3 is rotated at a speed in the range of 3000 to 3500 r.p.m. which is operative to effect a flow having a velocity in the nature of 2.5 to 3.0 miles per hour which is sufficient to substantially eliminate adherence of barnacles to surfaces within the body of water, such as docks, boat hulls, and the like.

It is to be understood that while I have illustrated and described one form of my invention, it is not to be limited to the specific form or arrangement of parts herein described and shown.

What I claim and desire to secure by Letters Patent is:

1. A water moving apparatus, for destratification and ice reduction and barnacle control, comprising:
   (a) a column member mounted on a support structure and extending into a body of water;
   (b) a submersible motor mounted adjacent a lower end of said column member;
   (c) a propeller rotated by said motor to effect an upwardly directed flow in the body of water;
   (d) a diffusing member mounted on said column member above said propeller, said diffusing member being cone-shaped to diffuse the flow outwardly; and
   (e) means completing a circuit between said motor and a source of electrical power, said circuit being operative to energize said motor to thereby rotate said propeller and move warmer subsurface water to the surface whereby natural stratification of the body is decreased and the temperature of the body of water is made more uniform.

2. A water moving apparatus as set forth in claim 1 wherein the mounting of said motor on said column member includes a plurality of arms extending between and having opposite ends secured to said cone-shaped diffusing member and said motor respectively, said arms having portions spaced outwardly of said propeller to be cleared by same when rotated and thereby provide a minimum of interference with the flow.

3. A water moving apparatus as set forth in claim 1 including means associated with the mounting of said column member for spacing said column member outwardly from the support structure.

4. A water moving apparatus as set forth in claim 1 wherein said motor is operative to rotate a shaft extending therefrom and having said propeller mounted thereon with the rotation of said shaft and propeller being at a speed to effect a velocity of the flow sufficient to substantially eliminate adherence of barnacles to surfaces within the body of water.

5. A water moving apparatus comprising:
   (a) a column member mounted on a support structure and extending downwardly therefrom into a body of water adjacent the support structure;
   (b) a propeller and means for mounting same in spaced relation below a lower end of said column member;
   (c) means operatively connected to said propeller for rotating same to effect an upwardly directed flow in the body of water;
   (d) means mounted on said column member in axial alignment with and above said propeller for diffusing the flow therefrom upwardly and outwardly to thereby move warmer subsurface water to the surface whereby natural stratification of the body of water is decreased and the temperature of the water adjacent the water moving apparatus is made more uniform;
   (e) said flow diffusing means being a cone-shaped member having a downwardly directed point; and
   (f) said propeller rotating means being a submersible motor mounted below a lower end of said column member.

6. A water moving apparatus as set forth in claim 5 wherein:
   (a) a pair of opposed arms extend between and have opposite ends thereof secured to said cone-shaped diffusing member and to said motor for mounting same below said diffusing member;
   (b) said arms have portions spaced outwardly of said propeller to be cleared by same when rotated to thereby provide a minimum of interference with the flow; and
   (c) one of said arms supports electrical conducting means electrically connected to a source of electrical power and to said motor to operate said motor.

7. A water moving apparatus as set forth in claim 6 wherein:
   (a) said cone-shaped diffusing member has an upwardly opening cavity with a boss therein; and
   (b) said column member is a tubular member having a lower end thereof aligned with said boss and mounted thereon to position said cone-shaped diffusing member in axial alignment with said column member and with said propeller to thereby center said column member in the upwardly and outwardly flow in the body of water.

8. A water moving apparatus as set forth in claim 7 including means associated with the mounting of said column member for spacing the water moving apparatus outwardly from the support structure.

9. A water moving apparatus comprising:
   (a) a column member mounted on a support structure and extending downwardly therefrom into a body of water adjacent the support structure;
   (b) a propeller and means for mounting same in spaced relation below a lower end of said column member;
   (c) means operatively connected to said propeller for rotating same to effect an upwardly directed flow in the body of water;
   (d) means mounted on said column member in axial alignment with and above said propeller for diffusing the flow therefrom upwardly and outwardly to thereby move warmer subsurface water to the surface whereby natural stratification of the body of water is decreased and the temperature of the water adjacent the water moving apparatus is made more uniform;
   (e) said propeller rotating means being a submersible motor mounted below a lower end of said column member;
   (f) said motor having a shaft extending upwardly therefrom with said propeller mounted thereon; and
   (g) said motor being operative to rotate said shaft and propeller at a speed to effect a velocity of the flow sufficient to substantially eliminate adherence of barnacles to surfaces within the body of water.

References Cited
UNITED STATES PATENTS

| | | | |
|---|---|---|---|
| 1,786,009 | 12/1930 | Duwe | 259—97 |
| 1,926,446 | 9/1933 | Klosson | 259—97 |
| 2,991,622 | 7/1961 | Oster | 61—1 R |

ROBERT M. WALKER, Primary Examiner

U.S. Cl. X.R.

61—1 R; 259—97